(No Model.) 2 Sheets—Sheet 1.
C. W. COLESWORTHY.
TOOL HOLDING ATTACHMENT FOR LATHES.
No. 319,071. Patented June 2, 1885.
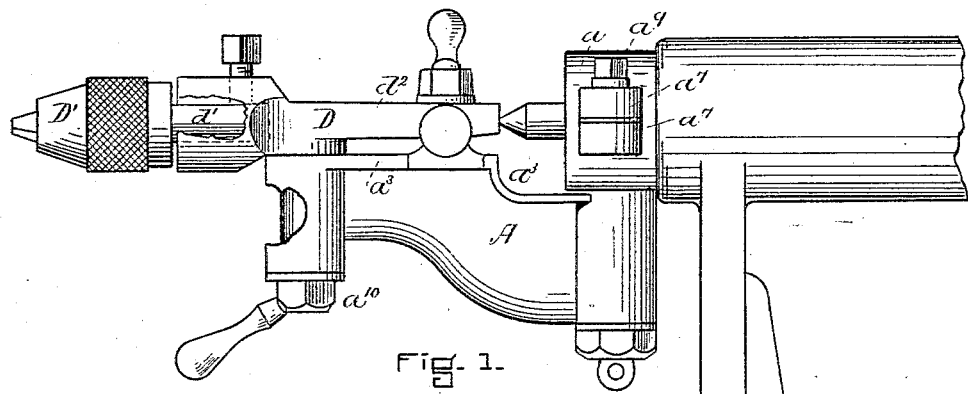
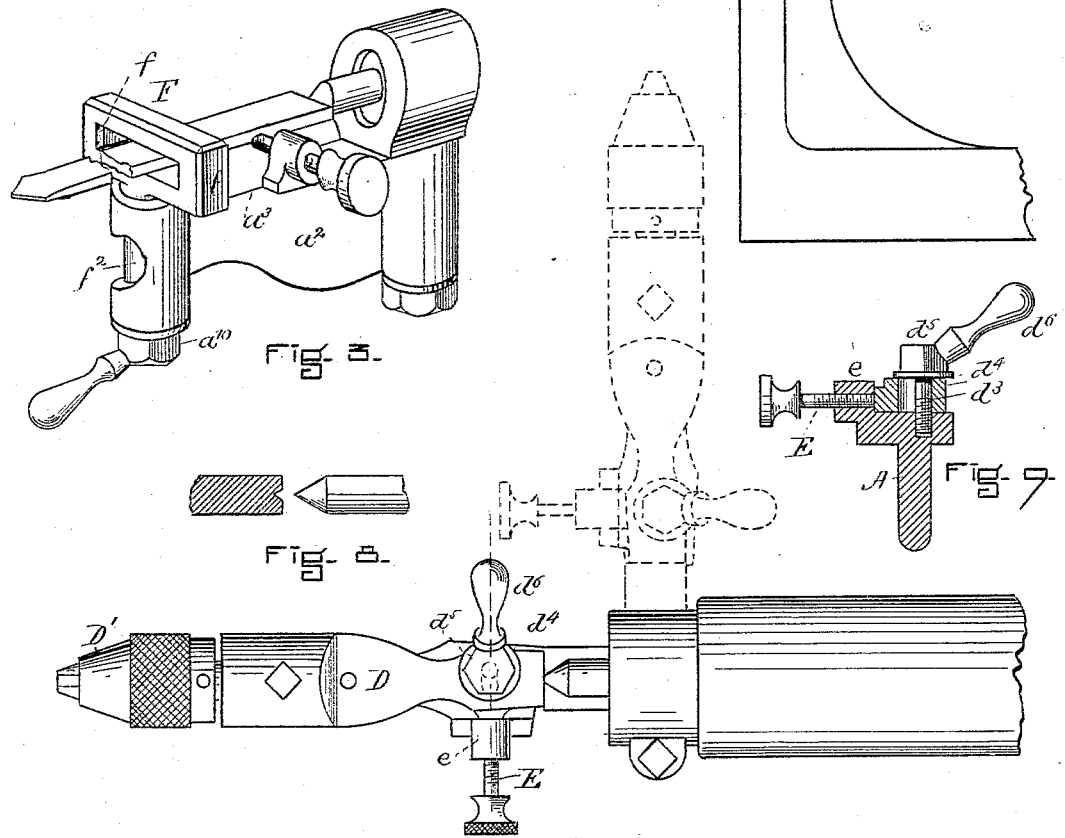
WITNESSES. INVENTOR.

(No Model.) 2 Sheets—Sheet 2.

C. W. COLESWORTHY.
TOOL HOLDING ATTACHMENT FOR LATHES.

No. 319,071. Patented June 2, 1885.

WITNESSES.
J. M. Dolan
Fred. B. Dolan

INVENTOR.
Charles W. Colesworthy
by his attys

UNITED STATES PATENT OFFICE.

CHARLES W. COLESWORTHY, OF BOSTON, ASSIGNOR OF TWO-THIRDS TO JAMES R. CARTER, OF NEWTON, AND EDWARD H. PALMER, OF READING, MASSACHUSETTS.

TOOL-HOLDING ATTACHMENT FOR LATHES.

SPECIFICATION forming part of Letters Patent No. 319,071, dated June 2, 1885.

Application filed January 29, 1885. (No model.)

*To all whom it may concern:*

Be it known that I, CHARLES W. COLESWORTHY, of Boston, in the county of Suffolk and State of Massachusetts, a citizen of the United States, have invented a new and useful Improvement in Tool Supports and Holders for Lathes, of which the following is a full, clear, and exact description, reference being had to the accompanying drawings, forming a part of this specification, in explaining its nature.

The object of the invention is to provide a tool holder and support which shall be attached to the foot-stock or dead-spindle of a lathe in a manner to be quickly moved into and out of operative position, so that the dead-center of the lathe may be used when necessary, or the tool holder and support brought into position immediately in front thereof without loss of time and without the necessity for adjustment, and as easily moved out of position, and so that there shall always be a tool holder or support which shall be in a condition for immediate use by being moved into operative position, and which can as easily be moved out of operative position to enable the center of the lathe to be used.

Figure 4:
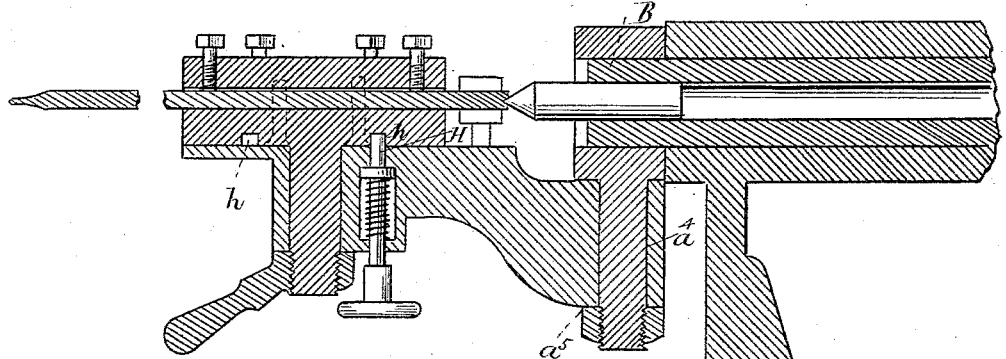
Figure 5:
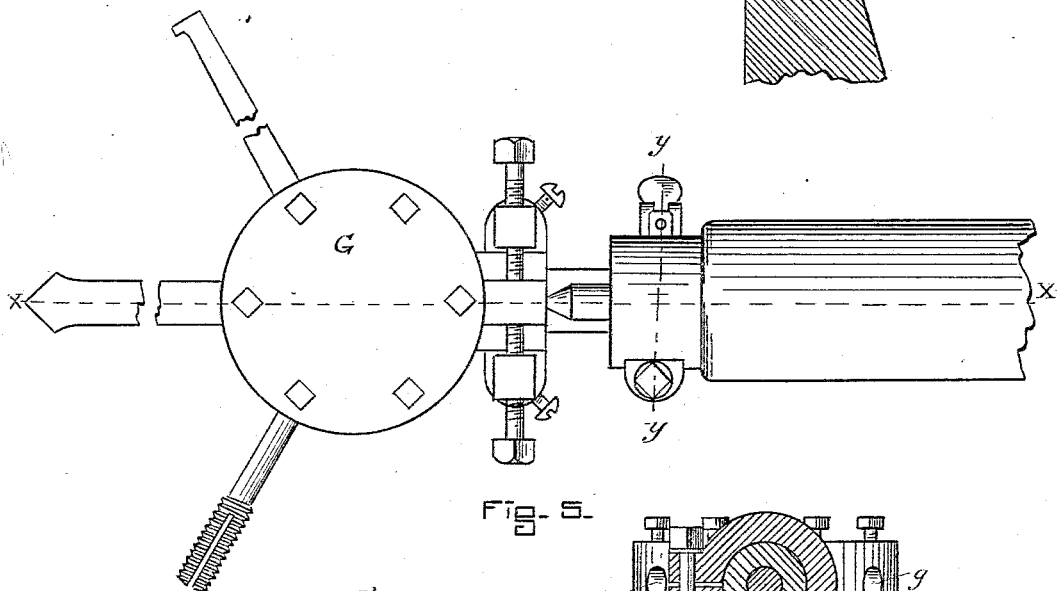
Figure 7:
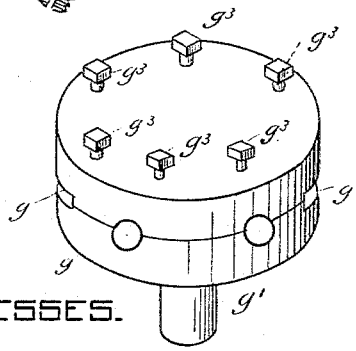
Figure 6:
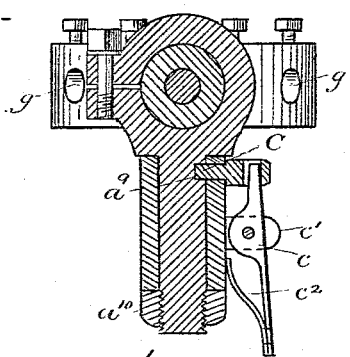

Referring to the drawings, Figure 1 is a side elevation of the bracket foot-stock or carriage supporting the dead-spindle of a lathe and of my tool-holder attached to the foot-stock of the lathe and in operative position. Fig. 2 is a plan view thereof, showing in dotted outline the position of the tool-holder when swinging to one side to expose the dead-center. Fig. 3 shows the holder when fitted to support a drill. Fig. 4 is a vertical central section upon the line $x$ $x$ of Fig. 5. Fig. 5 is a plan view of the tail-stock and tool-holder, showing a turret-holder attached thereto. Fig. 6 is a perspective view of the turret-holder, and Fig. 7 is a vertical section upon the line $y$ $y$ of Fig. 5. Figs. 8 and 9 are detail views.

The tool-holder support consists of an arm, A, having at its rear end a clamp or yoke, $a$, by which it is fastened to the spindle B of the tail-stock of the lathe, and at the front end a hole, $a'$, for receiving the spindle or stem of a tool holder or support. The arm A is made preferably in the form of a bracket, having a somewhat thin web, $a^2$, strengthened by the lateral extensions $a^3$. It is enlarged at the rear end to provide sufficient stock for the hole $a^4$, which receives the spindle $a^5$, which is attached to or forms a part of the clamp $a$ by which the arm A is attached to the spindle of the stock of the lathe, and upon which the arm swings horizontally. The clamp $a$ comprises a sleeve, $a^6$, which is cut open or across on one side and is of a size to fit the spindle of the tail-stock, having the lugs or projections $a^7$, also formed by slitting the sleeve, which form, as it were, the jaws of the clamp, and they have a screw-hole for the reception of the screw $a^8$, by which the two parts of the sleeve are drawn together in clamping. It will be seen that the arm A is rigidly attached to the spindle of the tail-stock in a manner to permit its being swung laterally in relation thereto from an inoperative position at one side of the stock or spindle to an operative position in line with the dead-center. In order to lock it automatically in operative position, I have formed in the stem or spindle $a^5$, on which the arm turns, a notch, $a^9$, (see Fig. 6,) and have secured to the portion of the arm A surrounding the stem or spindle the bolt or latch C, which is carried at the end of the thumb-lever $c$, pivoted to the supports $c'$, attached to the arm, and a spring, $c^2$, which bears against the lower end of the thumb-lever, serves to exert a constant inward pressure upon the locking-bolt, so that when the arm is turned upon the spindle sufficiently to bring it in line with the dead-center the bolt automatically enters the hole and locks the arm in place. The arm A is somewhat enlarged at its front end to furnish stock for the hole $a'$, holding the spindle of a tool holder or support.

In Figs. 1 and 2 I have represented a removable tool-holder, which consists of a block or plate, D, having a spindle, $d$, which enters the hole $a'$ of the arm, a hole or sleeve, $d'$, for holding a chuck, D', or the end of a tool, and the backward extension $d^2$, which has a slot, $d^3$, formed therein, through which passes the spindle or stem of the locking-screw $d^4$, which screws into a screw-hole in the upper surface of the arm A, and has an extension or clamping disk or head, $d^5$, from which projects the handle $d^6$; and there is used in this form of tool-holder, in addition to the locking device, an adjusting-screw, E, which is carried by the support or bracket $e$, extending up from the arm A, in which it screws, the end of the screw bearing against the side of the arm $d^2$. The end of the tool-holder has a center hole, $d^7$, which is immediately in front of the dead-center of the lathe, and a guide is thus furnished which indicates at sight the position of the tool-holder in relation to the centers.

It will be obvious that by loosening the locking-screw and using the adjusting-screw the tool-holder and the tool which it carries may be thrown from the central line either to the right or left of the center, as may be desired, and this adjustment of a tool is very desirable for certain kinds of work, and especially for enlarging the hole after the bearing which has been previously made is finished.

In lieu of this tool-holder for drills of a certain kind, I may substitute the holder and support F, shown in Fig. 3, which comprises the piece $f$, having the hole $f'$, through which the drill extends, and the spindle $f^2$, which enters the hole $a'$ in the arm A and receives the locking-nut $a^{10}$.

Another form of holder is shown in Figs. 5, 6, and 7. It is especially adapted for holding and supporting flat and round drills or tools having flat or round shanks. It comprises a turret, G, having the passages or holes $g$ extending across the same, of varying sizes and shapes, and the spindle $g'$, which enters the hole $a'$ in the arm, in which it is held in place by the nut $a^{10}$, and in which it is turned in revolving the turret-holder to bring either of the holes $g$ in line or substantially in line with the center. Each hole $g$ in the turret-holder has a locking-screw, $g^2$, entering it, which extends upward, and has the exposed head $g^3$. The turret is locked automatically to bring each of the holes $g$ in line with the dead-center by means of the spring-bolt H, vertically movable in the arm $a$, which enters any hole $h$ of a series formed in the under part of the turret, there being one hole $h$ for each tool-holder hole. (See Fig. 4.)

In lieu of the locking and adjusting screw shown in Figs. 1 and 2, I may use two horizontal screws, as shown in Fig. 5, so arranged that the shank of the tool-holder passes between them. These screws may each be held by a screw-holder upon a vertical spindle movable in a sleeve formed on the arm A and locked in place by a set-screw, as shown in Figs. 4 and 5.

It will be observed that by fastening the tool-holder to the spindle of the tail-stock these advantages are obtained: first, the holder can be quickly moved into and out of operative position, so that either the holder or center may be used; second, the tool-holder when in operative position is always centrally located and can be attached to all lathes now in use; third, by attachment to the spindle of the tail-stock it is given all the movements which may be imparted thereto.

Having thus fully described my invention, I claim and desire to secure by Letters Patent of the United States—

1. In combination with the tail-stock of a lathe, the arm A, adapted to have movement to and from a position in front of the center, as specified, and to hold, carry, or present tool holders or supports, all substantially as and for the purposes described.

2. In an attachment to the spindle of a tail-stock of a lathe, a tool-holder carrying and supporting arm having a clamp or fastening device at one end upon which the arm is movable, and also adapted to receive, hold, and carry a tool holder or support centrally, all substantially as and for the purposes described.

3. The combination of a spindle extending from the spindle of a tail-stock of a lathe with an arm, A, for supporting tools or tool-holders, movable in relation to the stock, and a locking device for locking the arm when moved into operative position, all substantially as and for the purposes described.

4. The combination of the spindle B of tail-stock, a spindle extending therefrom, the swinging tool-holder-carrying support or arm A, and a tool-holder attached thereto, all substantially as and for the purposes described.

5. The combination, in a swinging tool-holder-carrying support or arm adapted to be attached to the spindle of a tail-stock of a lathe, of the arm A and a removable tool holder or support, all substantially as described.

6. The combination, in a swinging tool-holder-carrying support or device adapted to be attached to the spindle of a tail-stock of a lathe, of the arm and a tool holder or support carried or supported thereby and adapted to have a movement upon a vertical center therein, all substantially as described.

7. The combination, in a tool-holder supporting or carrying device adapted to be attached to the spindle of a tail-stock of a lathe, of the arm A, a tool holder or support, and a lock for fastening it to the arm, all substantially as described.

8. The combination, in a tool-holder supporting or carrying device adapted to be attached to the spindle of a tail-stock of a lathe, of the arm A, a tool holder or support adapted to have a movement upon a vertical center, and adjusting-screws for moving the same and locking it in any desired position, all substantially as described.

9. The combination, in a tool-holder supporting or carrying device adapted to be attached to the spindle of a tail-stock of a lathe, of the arm A and the revolving turret tool holder or support G, all substantially as described.

CHAS. W. COLESWORTHY.

Witnesses:
F. F. RAYMOND, 2d,
FRED. B. DOLAN.